United States Patent Office 3,823,188
Patented July 9, 1974

---

3,823,188
BIS-META-PHENYLENE UREAS AND THEIR UTILITY AS HERBICIDES
Eugene G. Teach, El Cerrito, Calif., assignor to Stauffer Chemical Company, New York, N.Y.
No Drawing. Original application Oct. 12, 1970, Ser. No. 80,120, now Patent No. 3,707,556. Divided and this application Oct. 2, 1972, Ser. No. 294,113
Int. Cl. C07c 127/00
U.S. Cl. 260—553 C         2 Claims

ABSTRACT OF THE DISCLOSURE

Bis-meta-phenylene ureas having the formula:

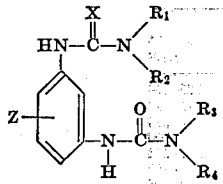

in which X represents oxygen or sulfur, $R_1$ represents lower alkyl or lower alkenyl, $R_2$ is hydrogen, $R_3$ represents alkyl, alkenyl, chloroacetyl, phenyl and chloro substituted phenyl, $R_4$ represents hydrogen, lower alkyl and furfuryl, and Z represents hydrogen or lower alkyl. The compounds of this invention are useful as herbicides.

---

This is a division of application Ser. No. 80,120, filed Oct. 12, 1970, now U.S. Pat. No. 3,707,556.

This invention relates to certain novel substituted bis-meta-phenylene ureas which are useful as herbicides. The compounds of the present invention are new compositions of matter and correspond to the general formula:

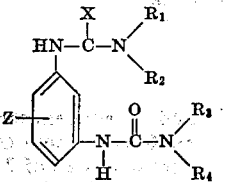

in which X represents oxygen or sulfur, $R_1$ represents lower alkyl or lower alkenyl, $R_2$ is hydrogen, $R_3$ represents alkyl, alkenyl, chloroacetyl, phenyl and chloro substituted phenyl, $R_4$ represents hydrogen, lower alkyl and furfuryl, and Z represents hydrogen or lower alkyl.

In the above description, the following preferred embodiments are intended for the various substituent groups: lower alkyl preferably includes, unless otherwise provided for, those members which contain from 1 to 6 carbon atoms, inclusive, in both straight chain and branch chain configurations, for example methyl, ethyl, n-propyl, isopropyl, n-butyl, sec.-butyl, amyl, isoamyl, n-hexyl, isohexyl, and the like; the term lower alkenyl preferably includes those members of the group containing at least one olefinic bond and containing from 3 to 6 carbon atoms, inclusive. X is defined as oxygen or sulfur, preferably oxygen. In one embodiment, X is oxygen, $R_1$ is lower alkyl, $R_2$ is hydrogen, $R_3$ is phenyl, $R_4$ is hydrogen and Z is hydrogen.

The compounds of this invention have been found to be active herbicides of a general type. That is, certain members of the class have been found to be herbicidally effective against a wide range of plant species. A method of controlling undesirable vegetation of the present invention comprises applying an herbicidally effective amount of the above-described compounds to the area or plant locus where control is desired.

An herbicide is used herein to mean a compound which controls or modifies the growth of plants. By a "growth controlling amount" is meant an amount of compound which causes a modifying effect upon the growth of plants. Such modifying effects include all deviations from natural development, for example, killing, retardation, defoliation, desiccation, regulation, stunting, tillering, stimulation, dwarfing and the like. By "plants" it is meant germinant seeds, emerging seedlings, and established vegetation including the roots and above-ground portions.

The compounds of the present invention are prepared by several different methods, depending upon the nature of the starting materials and the products desired. For example, the bis-meta-phenylene ureas are prepared by reacting a suitable aminophenyl urea with a suitable isocyanate or carbamyl chloride. The symmetrical ureas are obtained by employing the same reagents with meta-phenylene diamine. The reactions proceed readily in the liquid phase. The employment of a solvent is also useful, facilitating processing, as well as agitaion of the reactants. Solvents such as acetone are conveniently employed. The reactions are carried out at temperatures that permit operation in the liquid phase. These temperatures are between about room temperature and reflux temperature of the solvent, if a solvent is employed. Generally, the reaction mixture is refluxed at an elevated temperature for several hours. When using a carbamyl chloride as one of the reagents, it is preferable to employ an acid acceptor such as potassium carbonate to facilitate the reaction. After the reaction is completed, the recovery of the crude product is carried out by normal work-up procedures such as crystallization, sublimation or distallation.

The compounds of the present invention and their preparation are more particularly illustrated by the following examples. Following the examples is a table of compounds which are prepared according to the procedures described herein.

EXAMPLE I
Preparation of bis-1,1'-meta-phenylene-3,3-dimethyl-3'-methyl urea 1-meta-amino phenyl 3,3-dimethyl urea, 12.5 g., is dissolved in 100 ml. of acetone and 4.4 g. of methyl isocyanate added. The mixture is heated at reflux for 2 hours, cooled and the product crystallizes from solution. Trituration with hot isopropyl alcohol gives 3 g. of product, m.p. 335–337° C.

EXAMPLE II
Preparation of bis-1,1'-m-phenylene-3-methyl-3'-isopropyl urea 1-meta-amino phenyl-3-methyl urea, 11.3 g., is dissolved in 100 ml. of acetone and 6 g. of isopropyl isocyanate. The mixture is heated to reflux for 2 hours, cooled and the product crystallizes from solution. Trituration of the solid product gave 8.7 g., m.p. >300° C.

EXAMPLE III
Preparation of bis-1,1'-m-phenylene-3,3-diethyl-3'-methyl urea 1-meta-amino phenyl-3-methyl urea, 9.9 g., is dissolved in 100 ml. of acetone and 10 g. of anhydrous powdered potassium carbonate and 8.2 g. of diethyl carbamyl chloride is added. The mixture is stirred at reflux for 4–6 hours, cooled and poured into a 500 ml. water. The solid product is filtered off, washed with dilute acid and water and dried under vacuum. Yield was 15 g., of the title compound, m.p. 70–73° C.

EXAMPLE IV
Preparation of bis-1,1'-m-phenylene-3,3'-t-butyl urea

Meta-phenylene diamine, 7.6 g. is dissolved in 100 ml. of acetone and 15.4 g. of t-butyl isocyanate added. The mixture is refluxed for 6 hours, cooled in an ice bath and the crystalline product filtered off, washed with petroleum ether and dried. Yield is 4 g., of the title compound, m.p. 230–233° C. with sublimation.

The following is a table of the compounds which are prepared according to the aforementioned procedures. Compound numbers have been assigned to them and are used for identification throughout the balance of the specification.

— = no significant injury (approximately 0–10 percent control)
+ = slight injury (approximately 10–40 percent control)
++ = moderate injury (approximately 40–70 percent control)
+++ = severe injury or death (approximately 70–100 percent control).

TABLE 1

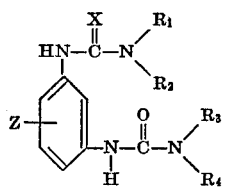

| Compound No. | R₁ | R₂ | R₃ | R₄ | X | Z | M.P. (° C.) $n_D^{30}$ |
|---|---|---|---|---|---|---|---|
| 1 | CH₃ | H | CH₃ | CH₃ | S | H | 123–126 |
| 2 | CH₃ | H | CH₃ | CH₃ | O | H | 335–337 |
| 3 | CH₃ | H | C₂H₅ | H | O | H | 210–213 |
| 4 | CH₃ | H | i-C₃H₇ | H | O | H | >300 |
| 5 | CH₃ | H | t-C₄H₉ | H | O | H | 202–204 |
| 6 | C₂H₅ | H | n-C₄H₉ | H | O | H | >250 |
| 7 | i-C₃H₇ | H | n-C₄H₉ | H | O | H | 190–195 |
| 8 | CH₃ | H | C₆H₅ | H | O | H | >300 |
| 9 | CH₃ | H | m-ClC₆H₄— | H | O | H | >300 |
| 10 | C₂H₅ | H | t-C₄H₉ | H | O | H | 340–344 |
| 11 | C₂H₅ | H | CH₂=CH—CH₂— | H | O | H | 323–324 |
| 12 | C₂H₅ | H | i-C₃H₇ | H | O | H | 343–347 |
| 13 | t-C₄H₉ | H | t-C₄H₉ | H | O | H | 230–233 |
| 14 | i-C₃H₇ | H | i-C₃H₇ | H | O | H | 331–335 |
| 15 | n-C₃H₇ | H | n-C₃H₇ | H | O | H | 350 |
| 16 | CH₂=CH—CH₂— | H | CH₂=CH—CH₂— | H | O | H | 314–319 |
| 17 | C₂H₅ | H | C₂H₅ | H | O | H | 326–328 |
| 18 | CH₃ | H | CH₃ | H | O | 2-CH₃ | ¹ 352–355 |
| 19 | CH₃ | H | CH₂ClCO | H | O | H | ¹ 195 |
| 20 | CH₃ | H | C₂H₅ | C₂H₅ | O | H | 70–73 |
| 21 | CH₃ | H | CH₃ | CH₂—furfuryl | O | H | $n_D^{30}=1.5720$ |
| 22 | i-C₃H₇ | H | CH₃ | CH₃ | O | H | 221–223 |
| 23 | t-C₄H₉ | H | CH₃ | CH₃ | O | H | $n_D^{30}=1.5700$ |

¹ Decomposition.

HERBICIDAL SCREENING TESTS

As previously mentioned, the herein described compounds produced in the above-described manner are phytotoxic compounds which are useful and valuable in controlling various plant species. Compounds of this invention are tested as herbicides in the following manner.

Pre-emergence herbicide test.—On the day preceding treatment, seeds of seven different weed species are planted in individual rows using one species per row across the width of the flat. The seeds used are hairy crabgrass (*Digitaris sanguinalis* (L.) Scop.), yellow foxtail (*Setaria glauca* (L.) Beauv.), watergrass (*Echinochloa crusgalli* (L.) Beauv), California red oat (*Avena sativa* (L.)), redroot pigweed (*Amaranthus retroflexus* (L.)), Indian mustard (*Brassica juncea* (L.) Coss.) and curly dock (*Rumex crispus* (L.)). Ample seeds are planted to give about 20 to 50 seedlings per row, after emergence, depending on the size of the plants. The flats are watered after planting. The spraying solution is prepared by dissolving 50 mg. of the test compound in 3 ml. of a solvent, such as acetone, containing 1% Tween 20® (polyoxyethylene sorbitan monolaurate). The following day each flat is sprayed at the rate of 20 pounds of the candidate compound per 80 gallons of solution per acre. An atomizer is used to spray the solution onto the soil surface. The flats are placed in a greenhouse at 80° F. and watered regularly. Two weeks later the degree of weed control is determined by comparing the amount of germination and growth of each weed in the treated flats with weeds in several untreated control flats. The rating system is as follows:

An activity index is used to represent the total activity on all seven weed species. It is the sum of the number of plus marks, so that an activity index of 21 represents complete control of all seven weeds. The results of this test are reported in Table II.

Post-emergence herbicide test.—Seeds of five weed species, including hairy crabgrass, watergrass, California red oats, Indian mustard, and curly dock and one crop, pinto beans (*phaseolus vulgaris*), are planted in flats as described above for pre-emergence screening. The flats are placed in the greenhouse at 72–85° F. and watered daily with a sprinkler. About 10 to 14 days after planting, when the primary leaves of the bean plant are almost fully expanded and the first trifoliate leaves are just starting to form, the plants are sprayed. The spray is prepared by weighting out 50 mg. of the test compound, dissolving it in 3 ml. of acetone containng 1% Tween 20® (polyoxyethylene sorbitan monolaurate) and then adding 5 ml. of water. The solution is sprayed on the foliage using an atomizer. The spray concentration is 0.5% and the rate would be approximately 20 lb./acre if all of the spray were retained on the plant and the soil, but some spray is lost so it is estimated that the application rate is approximately 12.5 lb./acre.

Beans are used to detect defoliants and plant growth regulators. The beans are trimmed to two or three plants per flat by cutting off the excess weaker plants, several days before treatment. The treated plants are placed back in the greenhouse and care is taken to avoid sprinkling the treated foliage with water for three days after treatment. Water is applied to the soil by means of a slow stream from a watering hose taking care not to wet the foliage.

Injury rates are recorded 14 days after treatment. The rating system is the same as described above for the pre-emergence test where (—), (+), (++), and (+++) are used for the different rates of injury and control. The injury symptoms are also recorded. The maximum activity index for complete control of all the species in the post-emergence screening test is 18 which represents the sum of the plus marks obtained with the six plant species used in the test. The herbicide activity index is shown in Table II.

TABLE II.—HERBICIDAL ACTIVITY SCREENING RESULTS

| Compound number | Herbicidal activity index [1] | |
|---|---|---|
| | Pre-emergence (20 lbs./a.) | Post-emergence (12.5 lbs./a.) |
| 1 | 0 | 11 |
| 2 | 7 | 15 |
| 3 | 0 | 14 |
| 4 | 15 | 16 |
| 5 | 17 | 17 |
| 6 | 13 | 14 |
| 7 | 7 | 12 |
| 8 | 0 | 13 |
| 9 | 0 | 8 |
| 10 | 14 | 14 |
| 11 | 3 | 7 |
| 12 | 7 | 11 |
| 13 | 8 | 10 |
| 14 | 3 | 9 |
| 15 | 2 | 5 |
| 16 | 0 | 7 |
| 17 | 5 | 8 |
| 18 | 1 | 2 |
| 19 | 6 | 13 |
| 20 | 15 | 18 |
| 21 | 11 | 18 |

[1] 21=70-100% control of all seven plant species tested pre-emergence; 18=70-100% control of all six plant species tested post-emergence.

The compounds of the present invention are used as pre-emergence or post-emergence herbicides and are applied in a variety of ways at various concentrations. In practice, the compounds are formulated with an inert carrier, utilizing methods well-known to those skilled in the art, thereby making them suitable for applicaton as dusts, sprays, or drenches and the like, in the form and manner required. The mixtures can be dispersed in water with the aid of a wetting agent or they can be employed in organic liquid compositions, oil and water, water in oil emulsions with or without the addtion of wetting, dispersing or emulsifying agents. An herbicidally effective amount depends upon the nature of the seeds or plants to be controlled and the rate of application varies from 1 to approximately 50 pounds per acre.

The phytotoxic compositions of this invention employing an herbicidally effective amount of the compound described herein are applied to the plants in the conventional manner. Thus, the dust and liquid compositions can be applied to the plant by the use of power-dusters, boom and hand sprayers and spray-dusters. The compositions can also be applied from airplanes as a dust or a spray because they are effective in very low dosages. In order to modify or control growth of germinating seeds or emerging seedlings, as a typical example, the dust and liquid compositions are applied to the soil according to conventional methods and are distributed in the soil to a depth of at least ½ inch below the soil surface. It is not necessary that the phytotoxic compositions be admixed with the soil particles and these compositions can be applied merely by spraying or sprinkling the surface of the soil. The phytotoxic compositions of this invention can also be applied by addition to irrigation water supplied to the field to be treated. This method of application permits the penetration of the compositions into the soil as the water is absorbed therein. Dust compositions, granular compositions or liquid formulations applied to the surface of the soil can be distributed below the surface of the soil by conventional means such as discing, dragging or mixing operations.

The phytotoxic compositions of this invention can also contain other additaments, for example, fertilizers, pesticides and the like, used as adjuvant or in combination with any of the above-described adjuvants. Other phytotoxic compounds useful in combination with the above-described compounds include, for example, 2,4-dichlorophenoxy-acetic acids, 2,4,5-trichlorophenoxyacetic acid, 2-methyl-4-chlorophenoxyacetic acid and the salts, esters and amides thereof; triazine derivatives, such as 2,4-bis(3-methoxypropylamino)-6-methyl-thio-S-triazine; 2-chloro-4-ethylamino - 6 - isopropylamino-S-triazine, and 2-ethyl-amino-4-isopropylamino - 6 - methylmercapto-S-triazine, urea derivatives, such as 3-(3,4-dichlorophenyl)-1,1-dimethyl urea and 3-(p-chlorophenyl)-1,1-dimethyl urea and acetamides such as N,N-diallyl-α-chloroacetamide, N-(α-chloroacetyl)hexamethylene imine, and N,N-diethyl-α-bromacetamide, and the like; benzoic acids such as 3-amino-2,5-dichlorobenzoic; and thiocarbamates, such as S-propyldipropylthiocarbamate; S - ethyl-dipropylthiocarbamate, S-ethylcyclohexyl-ethyl-thiocarbamate, S-ethyl hexahydro-1H-azepine-1-carbothioate and the like. Fertilizers useful in combination with the active ingredients include, for example, ammonium nitrate, urea and superphosphate. Other useful additaments include materials in which plant organisms take root and grow, such as compost, manure, humes, sand and the like.

The concentration of a compound of the present invention, constituting an effective amount in the best mode of administration in the utility disclosed, is readily determinable by those skilled in the art.

Various changes and modifications are possible without departing from the spirit and scope of the invention described herein and will be apparent to those skilled in the art to which it pertains. It is accordingly intended that the present invention shall only be limited by the scope of the claims.

What is claimed is:
1. A compound having the formula

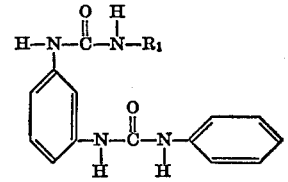

in which $R_1$ represents lower alkyl.
2. A compound according to Claim 1 in which $R_1$ is methyl.

References Cited
UNITED STATES PATENTS
3,386,955 6/1968 Nawakowski et al. 260—553 A X
3,119,865 1/1964 Wearley et al. 260—553 A X
3,184,301 5/1965 Martin et al. 260—553 A X LEON ZITVER, Primary Examiner
M. W. GLYNN, Assistant Examiner